United States Patent [19]
Overesch

[11] 3,751,889
[45] Aug. 14, 1973

[54] MOWING MACHINE
[75] Inventor: Albert Overesch, Spelle, Germany
[73] Assignee: Maschinenfabrik Bernard Krone GmbH, Spelle, Germany
[22] Filed: Oct. 22, 1971
[21] Appl. No.: 191,641

[30] Foreign Application Priority Data
Oct. 29, 1970  Germany............... P 20 53 073.8

[52] U.S. Cl........................ 56/13.6, 56/6, 56/15.8, 56/DIG. 1
[51] Int. Cl............................................ A01d 35/26
[58] Field of Search................... 56/1, DIG. 1, 13.5, 56/6, 13.6, 15.2, 15.3, 15.6, 15.7, 15.8, 16.4, 503

[56] References Cited
UNITED STATES PATENTS
| 3,063,226 | 11/1962 | Pfauser | 56/6 |
| 3,135,079 | 6/1964 | Dunn | 56/6 |
| 2,013,597 | 9/1935 | Blydenburgh | 56/15.8 |

FOREIGN PATENTS OR APPLICATIONS
| 240,536 | 9/1962 | Australia | 56/13.6 |
| 259,920 | 2/1968 | Austria | 56/13.6 |
| 339,342 | 12/1930 | Great Britain | 56/6 |
| 1,507,224 | 12/1969 | Germany | 56/DIG. 1 |
| 1,115,505 | 10/1961 | Germany | 56/13.6 |
| 1,520,475 | 3/1968 | France | 56/DIG. 1 |

Primary Examiner—Russell R. Kinsey
Assistant Examiner—J. N. Eskovitz
Attorney—Arthur O. Klein

[57]  ABSTRACT

Mowing machine with at least one mowing device driven so as to rotate around a generally vertical axis, the mowing device being mounted upon a supporting beam, and the mowing machine being designed as a trailer-type machine with a pull bar and ground-engaging supporting wheels. Each of the mowing devices is also supported on the ground by a supporting part. The supporting beam is braced by a system of guide bars connected to a separate machine frame so as to be able to swing freely parallel to itself up and down; the ground-engaging supporting wheels and the pull bar are connected to the frame.

11 Claims, 8 Drawing Figures

MOWING MACHINE

This invention relates to a mowing machine with at least one mowing device which is driven to rotate around a generally vertical axis, the mowing device being supported by a supporting beam. The mowing machine is designed as a trailer-type machine with a pull bar and is supported on the ground by track-supporting wheels.

In the case of prior art machines of this type, the supporting beam forms a rigid component of the machine frame so that adjustment of the ground clearance of the mowing device or devices arranged side by side is effected entirely by means of the track wheels. When the ground is uneven and expecially when the cutting width is substantial, the adjustment of the cutting heads of the mowing devices to an uneven ground is inaccurate and is insufficient to effect uniform mowing.

In the case of other known types of mowing machines, the supporting beam which supports the mowing devices can be attached via a suspension mechanism to a three-point hydraulic system of a tractor. Below the mowing devices of such machines there are supporting parts which run over the ground which provide the ground clearance adjustment, and which support the mowing devices. The suspension of the supporting beam of this type of mowing machine is pivoted so as to swing both vertically up and down and in a plane perpendicular to the direction of mowing motion. As a rule, such machines have sufficient ground adjustment, but especially in the case of large mowing widths, they are relatively heavy so that they can be attached only to appropriate high-capacity tractors.

The mowing machine according to this invention is of the type described in the introductory paragraph. It is characterized by the fact that the supporting beam provided for the mowing devices each of which is supported on the ground by a supporting part, is braced via a system of guide bars by a special machine frame so as to be able to swing freely parallel to itself up and down; the support wheels and the pull bar are attached to the aforementioned machine frame. The supporting beam is appropriately pivoted to the guide bars so as to be able to perform an additional swinging motion in the direction of a vertical plane perpendicular to the direction of mowing motion or travel of the machine. The connection to the guide bars can be effected by means of a double or universal joint, a ball-and-socket joint, or by means of rubber buffers.

The system of guide bars which control the swinging motion of the supporting beam comprises at least two parallel bars, both of which are attached near the ends of the supporting beam, while the supporting beam itself is preferably mounted, with regard to the direction of motion while mowing, in front of the machine frame.

According to the invention, the machine provides satisfactory adjustment of the mowing devices to an uneven ground, such adjustment being achieved by simple means. Due to its design as a trailer-type mowing machine, this device can be operated with little power by small and light-weight tractors, even if its cutting width is large, due to the provision of a number of mowing devices side-by-side and/or due to the diameter dimension of the cutting heads.

The machine frame is appropriately designed so as to be L-shaped; it consists essentially of a support arm at right angles to the direction of mowing motion, and of a traction arm which is located at its tractor side and extends in the direction of mowing motion. The pull bar can be pivoted to the front part of the traction arm and be disposed at different angles to the latter.

The mowing device or devices of the mowing machine of the invention are put into operation by a belt drive, one of the pulleys of such drive being located at the front side of the supporting beam, the other pulley being located at the machine frame so that the distance between the axles is essentially constant even during swinging movements of the supporting beam. This type of belt drive solves, with little structural expense, the problem of transmitting the driving force to the supporting beam which is movable, on the one hand, in relation to the machine frame and, on the other, in relation to the tractor which is the usual source of power. The belt drive provides at the same time overload protection which is desirable especially in the case of large mowing machines and those having mowing devices driven at high speeds of rotation.

In an especially simple embodiment of the mowing machine in accordance with the invention, the distance between the pulley axles corresponds somewhat to the effective length of the parallellogram bars, and the joint plane of revolution of the pulleys is somewhat parallel to the guide bars of the guide bar system controlling the supporting beam. To insure better absorption of the torque produced by the mowing devices during operation and affecting the supporting beam and consequently the parallel-ogram bar system, and thus to improve the parallel control of the supporting beam during its up-and-down movements, the guide bars of each parallel bar group are attached to cover plates on the supporting beam which project both upward and downward over the supporting beam. In this way, the points of engagement of the guide bars to the supporting beam are at a considerable distance from each other; this makes it easier at the same time to locate an imaginary connecting plane which contains the pulley axles in the area between the respective upper and lower guide bars of the parallel bar groups.

This keeps the distance variation between the belt pulley axles during the up-and-down movement of the supporting beam as low as possible, while the belt tension can easily be maintained at a desired level if the guide bars, according to the invention, are designed so as to be of variable length. The belt pulley which is attached to the machine frame may be driven via a set of transmission components forming a transmission train, by the power take-off connection of the tractor. The transmission train in this case consists appropriately of a shaft placed inside the pull bar, of a universal joint attached coaxially to the pivoted axle of the pull-bar pivot at the traction arm of the frame, and of an intermediate shaft and meshing miter gears, the drive pinion of which carries the frame-side belt pulley. This design insures, by simple means, that the frame which is supported on the ground through its support wheels can perform movements in relation to the trailer without affecting or impeding the energy transmission of the drive. This design makes it possible also to encase to a large extent the transmission components in the traction arm of the frame so that trouble-free operation is insured even under rough agricultural working conditions.

Between the supporting beam and the frame, there may be provided weight relief springs for the supporting beam so as to adjust the pressure with which the mowing devices rest on the ground. The weight relief springs, in an appropriate design, act upon guide bars of the two groups of parallel bars. On the other hand, the weight relief for the supporting beam can be provided by means of a pressure cylinder and another hydraulic means in order to lift the supporting beam in relation to the frame. In an especially simple design it is provided that the hydraulic cylinder acts upon the supporting beam through pressure relief springs. This design makes possible an especially simple adjustment of the force acting upon the supporting beam so as to achieve weight relief through the hydraulic cylinder. It also enables the same hydraulic cylinder to perform the mowing device lifting operation when the mowing machine has to be transported from or to the place of work.

The design described above can be combined in a very simple way with a set of crushing rollers forming between them a horizontal gap; the roller set can be attached directly to the frame behind the mowing devices in relationship to the direction of mowing motion. Such rollers increase the weight of a mowing machine, and require additional drive power. But as the machine is designed as a trailer-type mower, small tractors are capable of producing sufficient pull for the machine and sufficient power for driving the movable rollers. The crushing rollers may extend over the entire width of the machine, but the design provides only for a roller length extending over the width of a swath. The set of rollers is attached to the frame in such a way that it can be lifted from an operating position into a non-operating position.

A number of further characteristics and advantages will become evident from the specification in connection with the drawings which illustrate several embodiments of the mowing machine of the invention.

Figure 1:
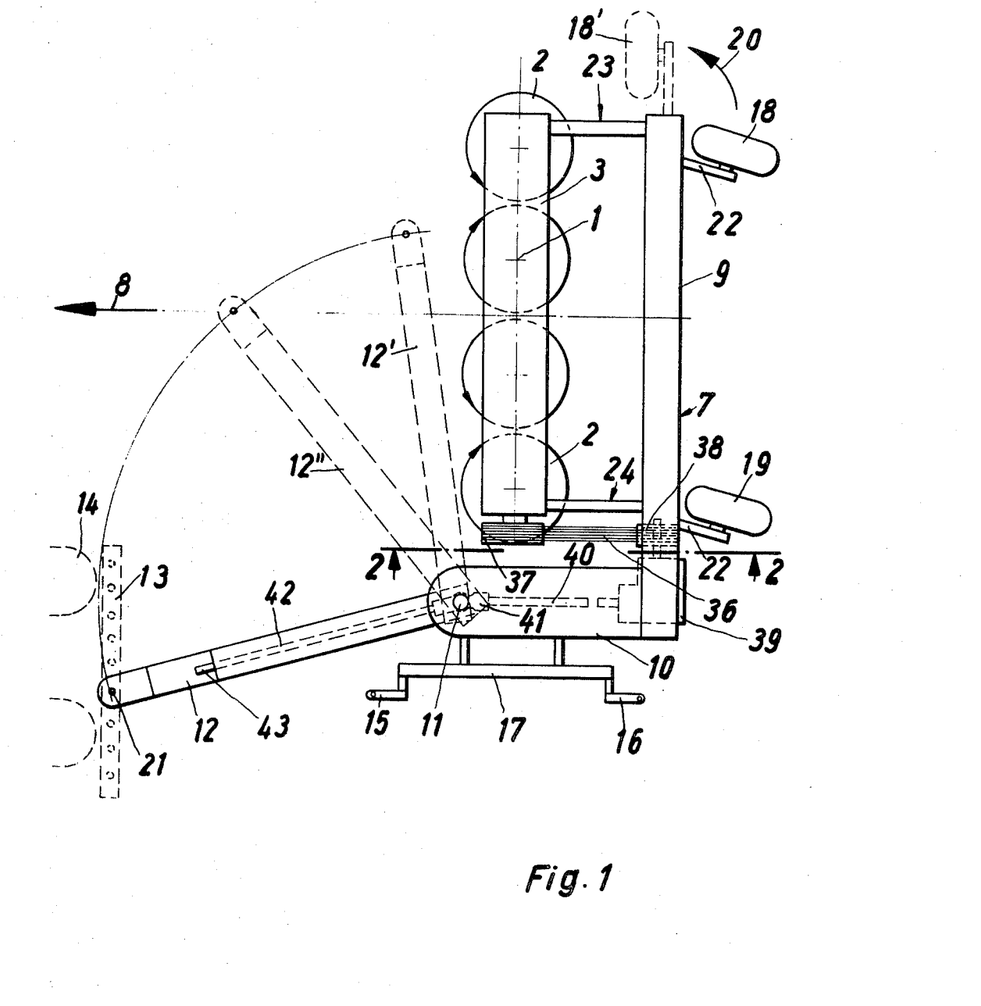
FIG. 1 is a simplified view in plan of a mowing machine in accordance with a first embodiment of the invention.
Figure 2:
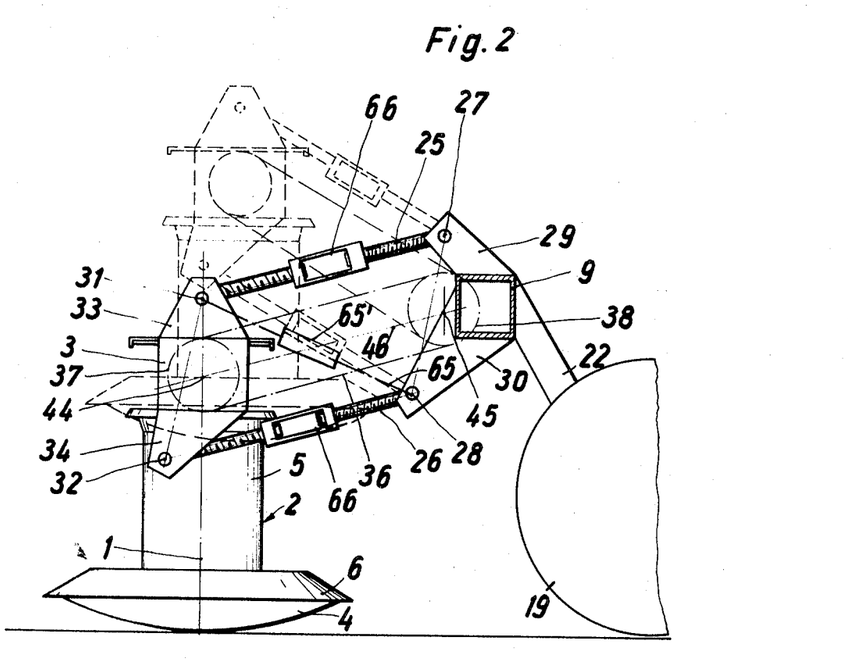
FIG. 2 is a fragmentary view partially in vertical transverse section and partially in side elevation of the machine of FIG. 1, the section being taken along line 2—2 of FIG. 1.
Figure 3:
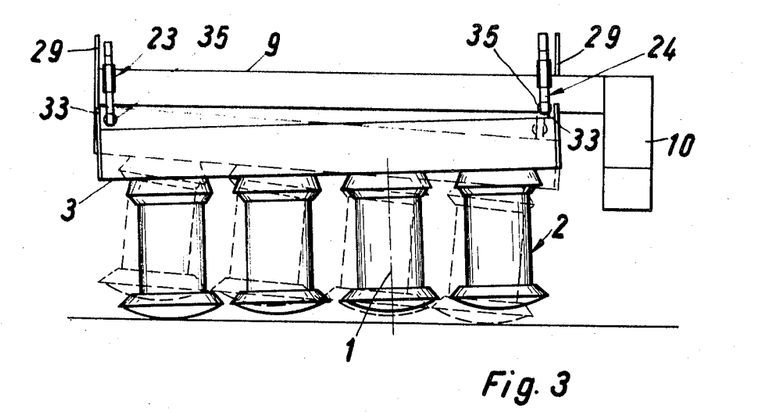
FIG. 3 is a fragmentary view in front elevation of the machine of FIGS. 1 and 2.

The first embodiment of the mowing machine illustrated in FIGS. 1 to 3, inclusive, has four mowing devices 2 which are driven to rotate around a generally vertical axis 1. These mowing devices 2 are pivoted to the underside of a supporting beam 3. They can be supported on the ground by means of a support member 4, and can be of any appropriate design. They can, for example, be shaped like a drum 5 the lower end of which forms a collar 6 and carries cutters (not shown) which project toward the outside. In the embodiment shown successive mowing devices 2 rotate in opposite directions.

The supporting beam 3 which may be provided with any desired number of mowing devices 2, e.g. only one pair of large mowing devices 2 is here shown carrying four devices 2. Beam 3 is pivoted to a machine frame 7 so as to be in a position to swing freely generally parallel to itself up and down with the help of a system of guide bars to be described. The frame 7 is L-shaped when viewed from above; it consists of a support arm 9 which is horizontal and exends at right angles to the direction 8 (FIG. 1) of mowing motion while the machine is in operation. This support arm 9 is joined at its tractor end (the lower end in FIG. 1) to a traction arm 10 which extends in the direction of motion 8. A pull bar 12 is pivoted to the front end of the traction arm 10 when related to the direction of motion 8; this pull bar 12 can swing around a generally vertical axis, and is connected to the bar 13 of a tractor schematically indicated at 14 by means of a vertical pivot pin 11.

The pull bar 12 can be disposed at different angles with respect to the traction arm 10, for which it is provided at its frame end with a notched segment. Neither this notched segment nor the latch disposed on arm 10 with which the segment is coordinated is shown in the drawings. Positions of the pull bar illustrated by broken lines represent the possible positions of the pull bar. Position 12' may, for example, be used during transportation of the machine. Position 12'', for example, can be used if the mowing machine is attached to a tractor (which is not as shown in FIG. 1 where the mower trails to the side of the tractor) in such a way that the mower trails essentially directly behind the tractor.

As is evident from FIG. 1, the long, external side of the traction arm 10 of the frame 7 is provided with a trailer frame 17 which carries wobblers 15, 16 and which makes it possible, especially in the case of large, wide machines, to connect the machine via the wobblers 15, 16 to the lower guide bars of the conventional three-point hydraulic system of the tractor 14. In this position the machine can be transported along any road without extending beyond the permissible tractor width.

Two track-supporting wheels 18, 19 are attached to the rear side, in relation to the direction 8 of mowing motion, of the support arm 9 of the machine frame. The common axis of rotation of these track wheels, during operation of the mowing machine, forms an angle somewhat different from a right angle with respect to the direction of motion 8 of the mowing machine, as shown in FIG. 1. In this way, the track-supporting wheels 18, 19 produce a torque in the direction of the arrow 20 (FIG. 1) which acts upon the frame 7; due to such torque the machine, which is pivoted to point 21 of the bar 13 on the tractor, assumes an operative position with the length of frame 7 at right angles to the direction of motion. The angle between the plane of rotation of the track-supporting wheels 18, 19 and the vertical plane parallel to the direction 8 of mowing motion is appropriately adjustable in order to control the torque, in the direction of the arrow 20, for each pull-bar position on bar 13, to the resistance the machine encounters during operation, and to other factors. This can be achieved simply by pivoting the track wheel supports 22 so that they can be moved to, and held in different operative positions.

The track-supporting wheels 18, 19 are attached to the frame 7, so as to be vertically adjustable with respect thereto so that the ground clearance can be controlled. Especially in the case of wide machines, the supporting wheel 18 is designed so that it can either be fixedly secured in the solid line position of FIG. 1 or swung into the position 18 shown by a broken line, where the swinging operation of wheel support 22 is carried out after appropriate disengagement of the means holding arm 22. The purpose of this construction is to provide a trailing support wheel 18 when the machine is attached to the tractor via the frame 17 and is to be transported thereby over the road in the direction which is vertical in FIG. 1. The support wheel 19 can in this case, by means of vertical adjustment, be lifted off the ground, or it may be lifted off the ground automatically depending on the setting of the three-point hydraulic system of the tractor. Means (not shown) are provided for holding the arm 22 and wheel 18 in the above-described dash line position thereof shown in FIG. 1.

The system of guide bars controlling the supporting beam 3 which is designed in one piece, consists, in the embodiment illustrated here, of two groups generally designated 23, 24 (FIGS. 2 and 3) of parallel guide bars each of which is pivotally connected to one end of the supporting beam 3. The upper guide bars are designated 25 and the lower ones 26 (FIG. 2). In the case of wide machines, however, the supporting beam may consist of two components connected by a joint, and the system of guide bars should preferably include a third group of parallel bars to be coordinated with the supporting beam in the area of the joint.

The guide bars 25, 26 are pivoted at points 27 and 28 to cover plates 29 and 30 which project upwardly and downwardly from the cross-sectional contour of the support arm 9. The guide bars 25 and 26 of each group, which extend forward in planes parallel to the direction 8 of mowing motion, are attached at points 31 and 32 to cover plates 33 and 34 which project upwardly and downwardly from the contour of the supporting beam 3. Whereas the connection between the guide bars 25, 26 and the cover plates 29, 30 of the support arm 9 may be effected by means of a normal pivot joint pin with a horizontal joint axle, the guide bars 25, 26 are connected with the cover plates 33, 34 of the supporting beam 3 by means of double, universal or ball-and-socket joints or by rubber buffer joints, in order to permit the supporting beam 3, in addition to its vertical movement up-and-down, to perform lateral movements in a plane which is at right angles with the direction of motion 8.

The principle of this lateral swinging movement is illustrated in FIG. 3, while the up-and-down swing is shown in FIG. 2. As a general rule, ball-and-socket joints or similar joint designs are sufficient to insure the desired lateral movement of the supporting beam 3. If the lateral swinging movement is required to exhibit more angular deflection, the joints 27, 28 of guide bar groups 23 or 24 can also be designed as ball-and-socket or rubber buffer joints, or the guide bars 25, 26 of one group can be made as plate springs so as to compensate for slight distance variations between the parallel bar planes of the two groups in the cases of large angular deflection. Another possibility consists in locating an upper spar above and parallel to the supporting beam 3, where the guide bars are attached to the spar, and in connecting the supporting beam 3 via a more or less central joint having a horizontal joint axle parallel to the direction of motion, with the upper spar so that the supporting beam 3 is suspended from the upper spar and can swing sideways freely in relationship to the latter. Although such a design is a little more expensive to construct, it provides a very sturdy structure.

The joints 27, 28, 31 and 32 lie at respective corners of a parallellogram of relatively large dimensions which is especially well-suited to absorb the torque which is produced by the mowing devices 2 and which acts counterclockwise (FIG. 2) upon the supporting beam 3, and tends to twist it around its longitudinal axis. To balance distance variations between the supporting beam 3 and the traction arm 9 of the machine frame 7 with respect to the range of deflection of the parallel guide bars 25, 26, the pivot points 31, 32, and 27, 28, are situated in planes which, in conjunction with an imaginary vertical plane passing through the axes of the mowing devices 2, form a pointed angle which points downward and to the front with its open side.

In the design of FIGS. 1 to 3, the mowing devices 2 are driven by a belt drive 36; one of the belt pulleys 37 is located at the tractor-side front end of the supporting beam 3, the other pulley 38 at the frame 7. The pulley 37 is fixedly mounted on the end of a drive shaft which is located longitudinally inside the supporting beam 3; this driveshaft transmits its rotation to the individual mowing devices 2 via respective bevel gear sets. The belt pulley 38 is fixedly secured to the drive shaft of a miter gear 39, whose drive shaft is connected through an intermediate shaft 40 with a universal joint 41. Transmission to the universal joint 41 is effected by a shaft 42 which is situated inside the pull bar 12 and whose connecting part 43 can be connected to a pivoted shaft with the power take-off of the tractor 14. This design makes it possible to encase the transmission components 39, 40, 42, and 42.

As is evident from FIG. 2, the axles 44, 45 of the belt pulleys 37, 38 lie in an imaginary joint plane 46 which is located between the upper and lower guide bars 25, 26 and is parallel to them. The distance between the two pulley axles corresponds to the effective length of the parallellogram bars 25, 26 so that the distance between the pulley axles does not vary during the up-and-down movements of the supporting beam of THE SUPPORTING BEAM . Dislocation of the belt pulley 37 due to the lateral movements of the supporting beam 3 is absorbed by the belt drive.

Figure 4:
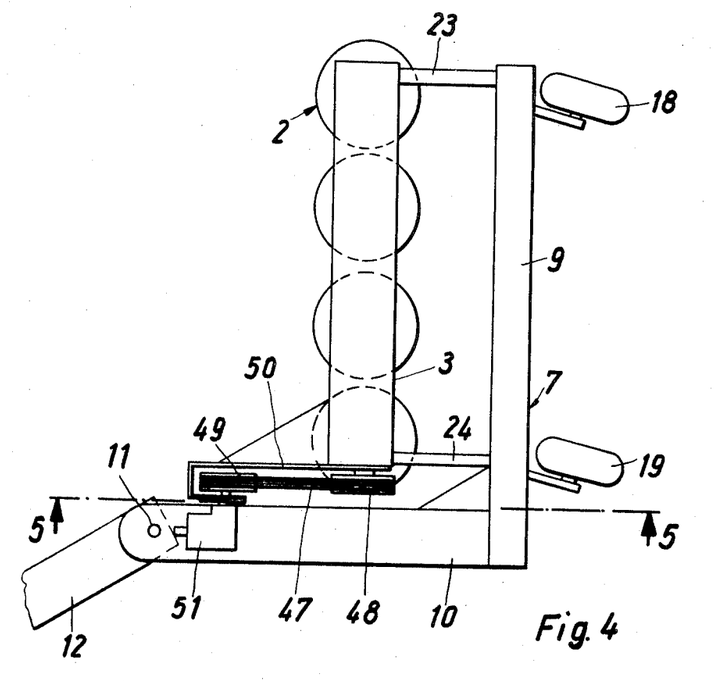
FIG. 4 is a view in plan similar to FIG. 1 of a second illustrative embodiment of the mowing machine of the invention.
Figure 5:
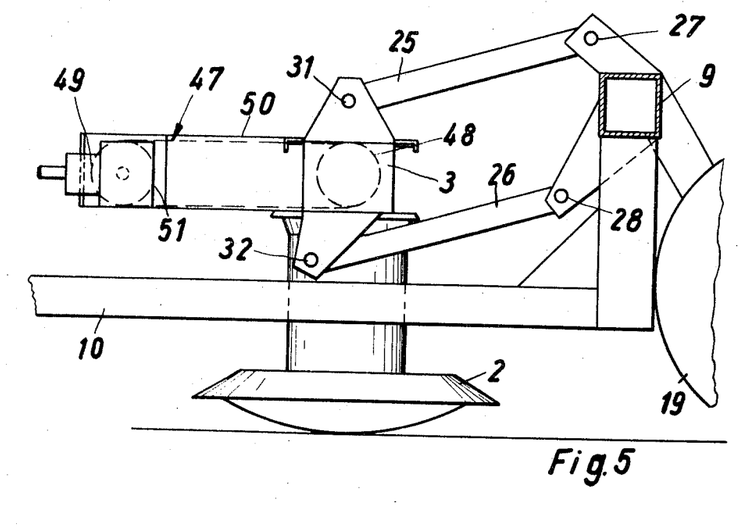
FIG. 5 is a fragmentary view partially in vertical transverse section and partially in side elevation similar to FIG. 2 of the mowing machine of FIG. 4, the section being taken along line 5—5 in FIG. 4.

Instead of the above-described specified tranmission train, the design of FIGS. 4 and 5 provides for a simpler drive which again consists of a belt drive, here designated 47', with one pulley 48' coordinated with the front end of the supporting beam 3, and the other pulley 49' attached to a support 50 which projects toward the front from the supporting beam 3. The housing of a miter gear 51 is secured directly to the support 50, and the belt pulley 49' is situated on the drive shaft of this miter gear. The drive shaft of the miter gear 51' is designed as a wobbler provided for a pivoted shaft leading to the tractor. A further, unillustrated design of the drive, which is practical especially for small machines, may consist of a miter gear the housing of which is directly flanged to the front end of the supporting beam 3, such miter gear being directly connected with the pivoted shaft of the tractor.

Figure 8:
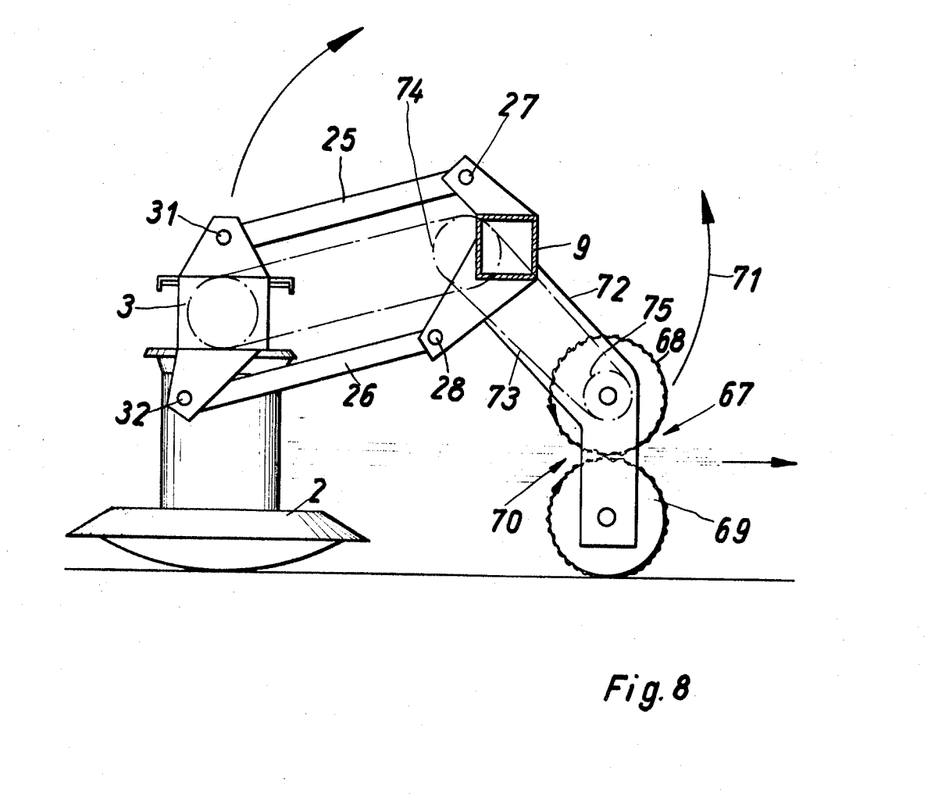
FIG. 8 is a fragmentary view in side elevation illustrating a third embodiment of the invention, such machine having a set of rollers combined with the mowing machine.

Compared with the drive designs of FIGS. 4 and 5, and that described immediately above, that illustrated in FIGS. 1 and 2 has the advantage of providing a power take-off at the machine frame 7, if desired, as shown in FIG. 8, the mowing machine is combined with a set of crushing rollers, as described below.

Figure 6:
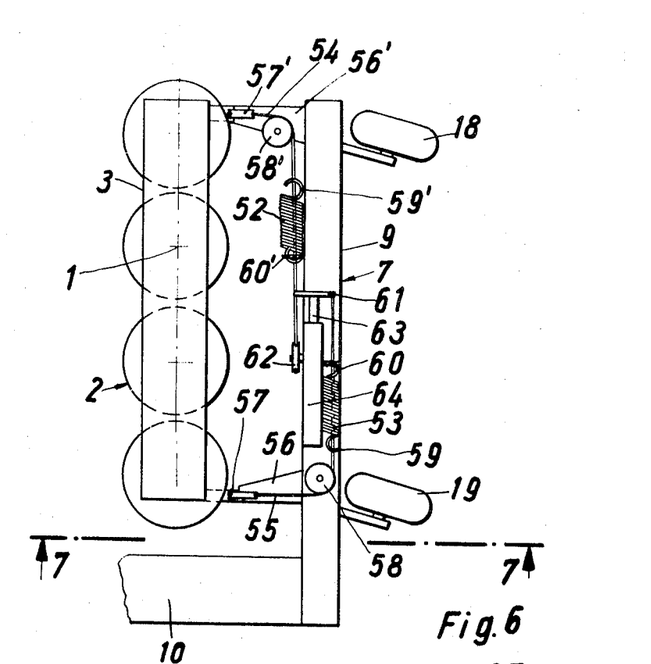
FIG. 6 is a fragmentary view in plan of a machine according to either of the above two embodiments thereof illustrating the weight balancing device of the supporting beam and its lift.
Figure 7:
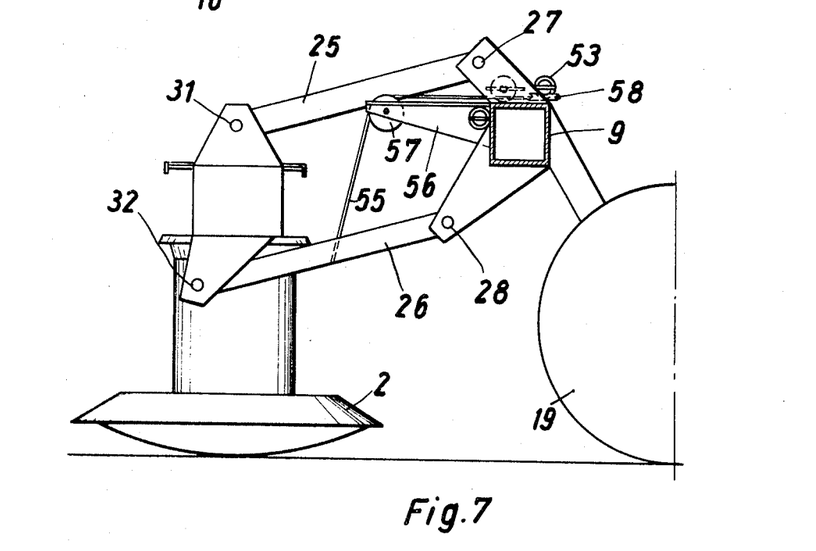
FIG. 7 is a fragmentary view partially in vertical transverse section and partially in side elevation of the device shown in FIG. 6, the section being taken along line 7—7 in FIG. 6.

FIGS. 6 and 7 show details of a device which is designed to provide a weight relief or balance for the supporting beam 3 and to lift the latter for transportation purposes. This device comprises relief springs 52, 53 which, in the embodiment shown here, act upon the lowerguide bars 26 of the parallel guide bar groups 23, 24 by means of a traction rope 54, 55. The traction rope 55, which leads to the lower guide bars 26 of the group 24 runs over a rope pulley 57 which rotates freely on a cross-bar 56 affixed to the support arm 9 of the frame; it runs, further, over a guide pulley 58 situated on the support arm 9, engages the end 59 of a coil tension spring 53, extends with a certain amount of sag or play to the other end 60 of the spring 53, to which the traction rope 55 is also attached, and is finally fixed to a cross piece 61 on support arm 9. The path of the other traction rope 54 is basically the same. Starting at the lower guide bar 26 of the group 23, the traction rope 54 runs over a rope pulley 57' and a guide pulley 58' both of which are attached to a cross bar 56, and extends from here to the end 59' of the reilef coil tension spring 52. From the fixing point at the end 59' of the relief spring 52, the traction rope 54 runs with a certain amount of sag or play through the relief spring 52, is connected with the other end 60' of spring 52, passes a guide pulley 62 which is attached to the support arm 9, and finally is secured to a cross piece 61 on support arm 9.

The cross piece 61 may, for example, be mounted on a bar so as to be movable in the longitudinal direction of the support arm 9 of the frame 7; thus its variable position determines the initial weight-balancing stress in the springs 52, 53. However, in the embodiment shown in the drawings, the cross piece 61 is attached to the end of a piston rod 63 of a fluid pressure-medium cylinder 64 which can be operated by the hydraulic system of the tractor. By means of this pressure-medium cylinder 64, the position of the cross piece 61 and consequently the weight relief can be controlled without difficulty. At the same time, this design enables the supporting beam 3 together with the mowing devices 2 to be lifted up whenever this is required for transportation of the mowing machine. Such lift position of the parts of the first-described embodiment is illustrated in FIG. 2 by broken lines.

FIG. 2 also shows a variant of the weight-relief and lifting device which is represented by a broken line 65 embodying a pressure-medium cylinder 65' at each pair of parallelogram guide bars 25, 26. These cylinders may be pivoted between points 28, 31 of the parallel guide bar groups. Alternatively, cylinders 65' and their linkages may be employed exclusively to provide the lifting mechanism, while the weight relief mechanism is constructed as shown in FIGS. 6 and 7.

As shown in FIG. 2, the guide bars 25 and 26 are adjustable in length; the means for such adjustment resembles a turnbuckle and includes oppositely threaded rods which can be adjusted by a joint tension sleeve lock 66. The main purpose of the variable length of the guide bars 25, 26 consists in controlling the belt tension of the belt drive 36. It is further possible to modify the kinematics of the system of parallelogram guide bars. By shortening the upper guide bars 25 and lengthening the lower guide bars 26 accordingly, it is possible to change the position of the mowing device axles 1 in relationship to the ground.

FIG. 8, finally, shows schematically a crushing device 67 which is supported by the frame 7 behind the mowing devices 2 with respect to the direction of mowing motion 8. The two rollers 68, 69, of the crushing device form a horizontal gap 70. The crushing rollers 68, 69 may extend over the entire machine width. Alternatively, however, the crushing device may consist of pairs of rollers, each of which extends over the width of a swath produced by one pair of mowing devices 2. This design is especially suited for mowing machines with two large mowing devices. The crushing rollers can pick up from the ground the material cut by the mowing devices 2 and transport it through their gap 70. On the other hand, it is possible that the mowed material is transported directly from the mowing devices 2 via sheet metal guides (which are not shown) to the gap 70 of the crushing rollers.

The crushing device 67 is pivoted to the machine frame 7 in such a way that it can be swung upward from its illustrated working position into a non-operative position, as shown by the arrow 71. This movement can be effected by a lifting mechanism similar to that of the supporting beam 3 shown in FIGS. 6 and 7. Alternatively, pressure-medium cylinders may be provided which act directly upon the guide spars 72 of the crushing device.

The rollers of the crushing device 67 may be driven by a hydraulic motor (not shown) which, in turn is driven by the hydraulic system of the tractor. The hydraulic motor drives the rollers 68, 69 synchronously and in opposite directions. Rollers 68 and 69 may be geared together for synchronous driving in opposite directions by meshing spur gears (not shown) drivingly connected to the respective rollers. The power for the crushing rollers, on the other hand, may also be taken off the drive for the mowing devices and be provided with a separate on/off control. The miter gear 39 may be used for this power take-off. A particularly simple drive consists of a belt drive 73 (FIG. 8), where the frame-side belt pulley 74 is attached coaxially beside the belt pulley 38 on the same driven shaft of the miter gear 39.

The above-referred to spur-wheel gear insures the synchronous drive in opposite directions of the crushing rollers 68, 69 if the second pulley 75 of the belt drive 73 is arranged on the axle of the crushing roller 68, as shown in the illustration.

The support arm 9 of the machine frame 7 may be connected at its rear end with other or additional devices. It is, for example, possible to provide instead of or in addition to the crushing device side-delivery plates or rakes so as to gather the cut material into one swath or to limit the side-delivery width.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

What is claimed is:

1. A trailer-type mowing machine comprising an elongated machine frame, a draw bar attached to the frame and adapted to be connected to a vehicle which pulls the frame in a direction transverse to its length, wheels on the frame for supporting it on the ground, a supporting beam which in operative position is disposed parallel to the frame, the supporting beam being mounted in front of the machine frame with respect to the direction of mowing motion of the machine, at least one mowing device rotating about a generally vertical axis being mounted on the supporting beam, means on the mowing device for supporting it on the ground, and a system of guide bars extending between and connected to the frame and the supporting beam for mounting the supporting beam for free vertical movement parallel to itself, means for pivoting the supporting beam to the guide bars, the guide bars controlling the supporting beam so that such beam is able to perform an additional swinging motion in the direction of a vertical plane perpendicular to the direction of mowing motion of the machine, the system of guide bars which controls the swinging motion of the supporting beam comprising at least two spaced groups of guide bars, each group being attached near the respective end of the supporting beam.

2. A machine according to claim 1, wherein the machine frame is L-shaped and comprises a support arm disposed at right angles to the direction of mowing motion, and a traction arm which is affixed to one end of the support arm and extends in the direction of mowing motion of the machine.

3. A machine according to claim 2, wherein the draw bar is pivoted to the front end of the traction arm of the frame and can be operatively engaged at different angles with respect to the traction arm, the plane of rotation of the frame-supporting wheels and the vertical plane which is parallel with the direction of mowing motion forms an acute angle, the angle of the plane of rotation of the frame-supporting wheels is adjustable with respect to the vertical plane which is parallel to the direction of mowing motion, the frame supporting wheels are mounted on the frame so as to be vertically adjustable with respect thereto, and at least one frame-supporting wheel can be swung from an operative position on the frame to a transportation position generally at right angles to the operative position thereof.

4. A machine according to claim 3, wherein the traction arm of the frame is provided with connecting components so that the frame may be connected with the lower guide bars of the three-point hydraulic system of the tractor.

5. A machine according to claim 1 and comprising weight-relief springs for the supporting beam provided between the latter and the machine frame, wherein the weight-relief springs act upon the guide bars of the two parallel guide bar groups, a pressure-medium cylinder positioned between the guide bars of each parallel guide bar group so as to provide for at least one of weight relief and the lifting of the supporting beam, a pressure-medium cylinder attached to the supporting beam for the purpose of lifting the latter, and wherein the pressure-medium cylinder provided for the lifting of the supporting beam acts upon the latter via weight-relief springs for the supporting beam.

6. A machine according to claim 1, comprising a crushing device which has a horizontal gap and is connected to the frame behind the mowing device in the direction of mowing motion of the machine, wherein the crushing device is attached to the frame so as to be able to be swung upward from a working position into an inoperative position, and comprising a drive for the lifting of the crushing device, such drive being so constructed that it can be operated in conjunction with or independently of the drive provided for the lifting of the supporting beam, and means for driving the rollers of the crushing device, the drive for the crushing device being taken off the drive for the mowing device and being provided with a separate on/off control.

7. A machine according to claim 1, wherein the guide bars are of variable length, and comprising means for holding the arms at their adjusted lengths.

8. A machine according to claim 1, wherein the mowing machine is drawn by a tractor having a power take-off, and comprising a drive train extending from the tractor and the mowing device.

9. A machine according to claim 8, wherein the drive train includes a belt drive comprising spaced pulleys connected by a belt, one of the pulleys being located at the tractor-side front end of the supporting beam, the other pulley being located at the machine frame, the distance between the axles of the pulleys being essentially constant during swinging movements of the supporting beam.

10. A machine according to claim 8, wherein the drive train comprises a shaft located inside the draw bar, a universal joint attached coaxially with regard to the common axis of the draw bar pivot at the traction arm of the machine frame, an intermediate shaft, a miter gear set the drive shaft of which supports a belt pulley, and a driving belt entrained over the pulley and extending between the frame and the supporting beam.

11. A machine according to claim 1, comprising a belt drive for operating the mowing device, said belt drive having one belt pulley located in front of the tractor-side front end of the supporting beam, and a second pulley attached to the driven shaft of a miter gear set which is attached to a support projecting toward the front from the supporting beam.

* * * * *